United States Patent
Gross et al.

(10) Patent No.: US 7,480,517 B2
(45) Date of Patent: Jan. 20, 2009

(54) METHOD OF POWER CONTROL IN A WIRELESS COMMUNICATION SYSTEM

(75) Inventors: Jonathan H. Gross, Gilbert, AZ (US); Murali Ranganathan, Phoenix, AZ (US)

(73) Assignee: Motorola, Inc., Schaumburg, IL (US)

( * ) Notice: Subject to any disclaimer, the term of this patent is extended or adjusted under 35 U.S.C. 154(b) by 704 days.

(21) Appl. No.: 11/116,662

(22) Filed: Apr. 27, 2005

(65) Prior Publication Data
US 2006/0246936 A1  Nov. 2, 2006

(51) Int. Cl.
*H04B 7/00* (2006.01)

(52) U.S. Cl. ............... 455/522; 455/68; 455/69; 455/127.1; 455/135

(58) Field of Classification Search ......... 455/522, 455/68, 69, 115.3, 126, 127.1, 296, 127.2, 455/67.11, 135, 226.3, 277.2, 434, 436; 370/331, 370/320, 335, 342, 318, 392, 252, 276, 280
See application file for complete search history.

(56) References Cited

U.S. PATENT DOCUMENTS

| | | | |
|---|---|---|---|
| 5,056,109 A | 10/1991 | Gilhousen et al. | |
| 6,272,235 B1 | 8/2001 | Bacus et al. | |
| 6,366,778 B1 | 4/2002 | Bender et al. | |
| 6,654,608 B1 | 11/2003 | Monell et al. | |
| 6,708,041 B1 | 3/2004 | Butovitsch et al. | |
| 6,757,320 B2 | 6/2004 | Tiedemann, Jr. et al. | |
| 6,839,567 B2 | 1/2005 | Ozluturk et al. | |
| 6,907,018 B1 * | 6/2005 | Paranchych et al. | 370/332 |
| 6,937,584 B2 * | 8/2005 | Chaponniere et al. | 370/335 |
| 7,009,944 B1 * | 3/2006 | Hulbert | 370/278 |
| 7,027,420 B2 * | 4/2006 | Hamalainen | 370/335 |
| 7,286,846 B2 * | 10/2007 | Chen et al. | 455/522 |
| 7,295,855 B1 * | 11/2007 | Larsson et al. | 455/522 |
| 2001/0038619 A1 * | 11/2001 | Baker et al. | 370/335 |
| 2002/0009061 A1 * | 1/2002 | Willenegger | 370/328 |
| 2004/0106423 A1 * | 6/2004 | McGowan et al. | 455/522 |
| 2004/0156328 A1 * | 8/2004 | Walton et al. | 370/313 |
| 2004/0203782 A1 | 10/2004 | Peng et al. | |
| 2005/0239491 A1 * | 10/2005 | Feder et al. | 455/522 |
| 2006/0019694 A1 * | 1/2006 | Sutivong et al. | 455/522 |
| 2006/0030352 A1 * | 2/2006 | Kiran et al. | 455/522 |

* cited by examiner

*Primary Examiner*—Duc Nguyen
*Assistant Examiner*—Dominic E Rego

(57) ABSTRACT

A method of power control in a 3G wireless communication system (100) incorporating fast forward power control, may include setting an initial base station transmit power boundary (402) and an initial signal-to-noise ratio boundary (502). A mobile station (102) may send a forward link FER measurement to a base station (106). The base station may perform at least one of a base station transmit power boundary adjustment (403) and a mobile station signal-to-noise ratio boundary adjustment (503) based on the forward link FER measurement received from the mobile station, thereby imposing dynamic constraints on the fast forward power control operation.

18 Claims, 4 Drawing Sheets

METHOD OF POWER CONTROL IN A WIRELESS COMMUNICATION SYSTEM

BACKGROUND OF INVENTION

Mobile telecommunication systems include wireless links between mobile stations (MS), which may be mobile telephones, pagers, computers, etc., and a base station (BS) of the mobile telecommunication system. Since these links are wireless, the links are susceptible to noise and interference with other signals. The signals received at the mobile station or at the base station may fade due to errors in the RF links or legs coupling the base station to the mobile station. That is, the data signals received by the mobile station may become much more attenuated than the surrounding noise and other interference.

The quality of wireless telecommunication is often measured by the ability of the mobile station to receive accurate and clear data from the base station. As errors are detected by the mobile station, the base station may increase the transmission power on the leg that couples the base station and the mobile station. When greater power is used on a RF link or leg, the power increase causes interference for other links or legs coupling the base station to other mobile stations and with other links from other base stations coupling to the mobile station in a soft handoff configuration.

When the RF links, or legs, between the mobile station and a base station becomes weak, for example, a hill might interfere with line-of-sight transmission, typical base station equipment tends to rapidly drive up the weak leg or link to full power. This creates several problems. The first being that since the base station has a finite amount of power, using excessive power in any one link will necessarily limit the power available for links with other mobile stations. Second, excessive use of power by base station creates more RF interference for other mobile stations in the area.

In real RF conditions, aspects such as link imbalance can cause errors in fast forward power control information received from the mobile station, which can cause the BS to ramp up to excessive transmit power, particularly in soft handoff conditions. Deep fades or momentary RF blocking can also cause the mobile station to overshoot its target signal-to-noise ratio setpoint, further exacerbating the problem. Both of these cause the BS to ramp up its transmit power far in excess of what is required. The prior art has static setpoints for maximum transmit power from the base station and maximum signal-to-noise ratio setpoint for the mobile station. Therefore, the prior art is unable to efficiently cope with errors in fast forward power control information and deep fades.

Accordingly, it would be highly desirable to have method of adjusting maximum and minimum BS transmit power boundaries in a wireless communication system.

BRIEF DESCRIPTION OF THE DRAWINGS

Representative elements, operational features, applications and/or advantages of the present invention reside inter alia in the details of construction and operation as more fully hereafter depicted, described and claimed—reference being made to the accompanying drawings forming a part hereof, wherein like numerals refer to like parts throughout. Other elements, operational features, applications and/or advantages will become apparent in light of certain exemplary embodiments recited in the Detailed Description, wherein:

Figure 1:
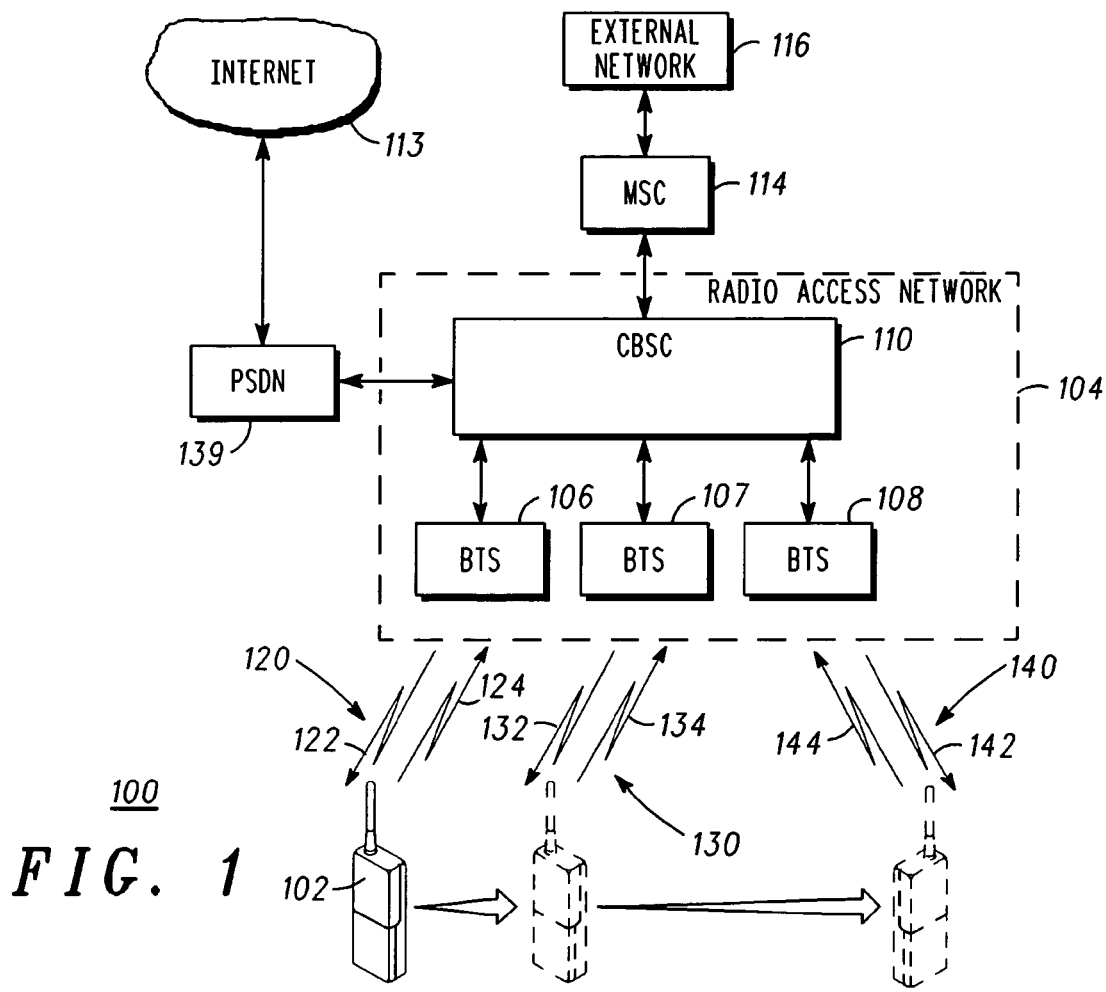
FIG. 1 representatively illustrates a wireless communication system in accordance with an exemplary embodiment of the present invention.

Elements in the Figures are illustrated for simplicity and clarity and have not necessarily been drawn to scale. For example, the dimensions of some of the elements in the Figures may be exaggerated relative to other elements to help improve understanding of various embodiments of the present invention. Furthermore, the terms "first", "second", and the like herein, if any, are used inter alia for distinguishing between similar elements and not necessarily for describing a sequential or chronological order. Moreover, the terms "front", "back", "top", "bottom", "over", "under", and the like in the Description and/or in the Claims, if any, are generally employed for descriptive purposes and not necessarily for comprehensively describing exclusive relative position. Any of the preceding terms so used may be interchanged under appropriate circumstances such that various embodiments of the invention described herein may be capable of operation in other configurations and/or orientations than those explicitly illustrated or otherwise described.

DETAILED DESCRIPTION OF EXEMPLARY EMBODIMENTS

The following representative descriptions of the present invention generally relate to exemplary embodiments and the inventor's conception of the best mode, and are not intended to limit the applicability or configuration of the invention in any way. Rather, the following description is intended to provide convenient illustrations for implementing various embodiments of the invention. As will become apparent, changes may be made in the function and/or arrangement of any of the elements described in the disclosed exemplary embodiments without departing from the spirit and scope of the invention.

A detailed description of an exemplary application, namely a method of power control in a wireless communication system, is provided as a specific enabling disclosure that may be generalized to any application of the disclosed system, device and method in accordance with various embodiments of the present invention.

In a 3G code division multiple access (CDMA) mobile telecommunication system utilizing fast power control, power control bits are continuously transmitted by both mobile stations and base stations to the other requesting that the entity at the other end of the mobile link power up or power down. Typically each mobile unit continuously sends power control bits (PCBs) to the base station requesting that the base station transmit its information with greater power since the signal being received is fading.

A frame erasure rate (FER) measures the number of data frames transmitted by the base station to the mobile unit, which are received in error on the forward link. A typical scenario for high frame erasure rates consists of a moving mobile unit that loses a good line-of-site coupling with the base station. The scenario is that the mobile unit transmits consecutive requests for powering up by the base station of its forward link transmissions to the mobile unit. Such powering up on the forward link presents more interference to other mobile units in line-of-sight communication with the base station or another base station, which this causes the base station to use excessive power for one particular mobile unit.

In third generation wireless (3G) systems, the mobile's signal-to-noise ratio (Eb/No) setpoint may be adjusted dynamically based on frame erasure events in order to maintain a target frame erasure rate (FER). The actual transmit power level at the base station is dynamically adjusted, based on power up or power down bits sent by the mobile to the base station at a high rate, in order to maintain a received Eb/No at the mobile according to the current value of the mobile's Eb/No setpoint. The adjustment of the base station's transmit power level based on power control bits received by the base station from the mobile station is referred to as fast forward power control. The adjustment by the mobile of its target Eb/No setpoint based on frame erasure events (or lack thereof) in order to maintain a target FER is referred to as outer loop power control. Both mechanisms work together in 3G systems to achieve a target quality of service level across a variety of changing link conditions, while conserving transmit power, reducing interference, and increasing system capacity.

Wireless communication systems are well known and consist of many types including land mobile radio, cellular radiotelephone (inclusive of analog cellular, digital cellular, personal communication systems (PCS) and wideband digital cellular systems), and other communication system types. In cellular radiotelephone communication systems, for example, a number of communication cells are typically comprised of one or more Base Transceiver Stations (BTS's) coupled to one or more Base Station Controllers (BSCs) or Central Base Station Controllers (CBSCs) and forming a Radio Access Network (RAN). The BSCs or CBSCs are, in turn, coupled to a Mobile Switching Center (MSC) that provides a connection between the RAN and an external network, such as a Public Switched Telephone Network (PSTN), as well as interconnection to other RANs. Each BTS provides communication services to a mobile station (MS) located in a coverage area serviced by the BTS via a communication resource that includes a forward link for transmitting signals to, and a reverse link for receiving signals from, the MS.

FIG. 1 representatively illustrates a wireless communication system 100 in accordance with an exemplary embodiment of the present invention. Wireless communication system 100 includes a RAN 104 comprising multiple BTSs 106-108 that are each coupled to a CBSC 110. RAN 104 is coupled to an MSC 114, and MSC 114 is in turn coupled to an external network 116 and provides a communication link between the external network, or other RANs, and RAN 104. In an embodiment, RAN 104 is a CDMA network.

Wireless communication system 100 may further include a mobile station 102 coupled to BTS 106 via wireless link 120. In an embodiment, wireless link 120 may include a forward link 122 for communications from BTS 106 to mobile station 102, and reverse link 124 for communications from mobile station 102 to BTS 106.

In an embodiment, RAN 104 may be coupled to a PDSN 139, which is coupled to operate as the gateway from the RAN 104 into a public and/or private packet network, for example and without limitation, the Internet 113. In an embodiment, PDSN 139 may act as a network access server, home agent, foreign agent, and the like. PDSN 139 may manage the radio-packet interface between RAN 104 and Internet 113, provide IP addresses for the subscriber's mobile station 102, perform packet routing, actively manage subscriber services based on profile information, authenticate users, and the like.

Fundamental to a wireless communication system is the ability to maintain established communication connections while an MS moves in and between coverage areas. In order to maintain established communication connections, 'soft-handoff' techniques have been developed for code division multiple access (CDMA) communication systems whereby an MS is in concurrent, active communication with multiple BTSs. Each BTS in active communication with the MS is a member of an 'active set' of the MS and transmits bearer traffic to, and receives bearer traffic from, the MS. As the MS moves through the communication system, BTSs are added to, or deleted from, the MS's active set so as to assure that the MS will always be in communication with at least one BTS.

As an example of an embodiment, wireless communication system 100 may further include an MS 102 that concurrently is in active communication with each of BTS 106 and 107. That is, MS 102 is in 'soft-handoff' with each of BTSs 106 and 107 and each of BTS 106 and BTS 107 is a member of an 'active set' of MS 102. As members of the active set of MS 102, each BTS of BTSs 106 and 107 concurrently maintains a respective wireless communication link 120, 130 with the MS. Each communication link 120, 130 includes a respective forward link 122, 132, for conveyance of signals to MS 102 and a respective reverse link 124, 134, for receipt of signals from the MS.

Each BTS 106, 107 in the active set of MS 102 conveys the same bearer traffic to, and receives the same bearer traffic from, the MS. By providing multiple BTSs that concurrently convey same signals to, and receive same signals, from MS 102, communication system 100 enhances the likelihood that the MS will receive an acceptable quality signal from BTS 104 and that the BTS will receive an acceptable quality signal from the MS. For example, when each BTS of BTSs 106 and 107 receives a same frame from MS 102, the BTS determines whether the received frame is acceptable or erroneous and forwards the frame, and an accompanying indicator of whether the frame is acceptable, that is, good, or erroneous, that is, erased, to CBSC 110.

As MS 102 heads towards a coverage area, or sector, associated with BTS 108, a signal strength of a pilot signal received by MS 102 from BTS 108 via a forward link 142 associated with BTS 108 increases until MS 102 identifies the pilot signal from BTS 108 as a viable communication link. In addition, as MS 102 heads away from a coverage area, or sector, associated with BTS 106 a signal strength of a pilot signal received by MS 102 from BTS 106 via forward link 122 may deteriorate to the point that MS 102 determines that communication link 120 is no longer a viable communication link. MS 102 then requests that communication system 100 add BTS 108 to the MS's active set, that is, establish a communication link 140 associated with BTS 108, comprising forward link 142 and a reverse link 144, as an active communication link for transmitting data to, and receiving data from, MS 102, and drop BTS 106 from the active set, that is, terminate communication link 120. Typically, the request to add or drop a BTS is conveyed by MS 102 via a Pilot Strength Measurement Message (PSMM). As an example, upon receiving the PSMM message, BTS 106 is dropped from the active set of MS 102 and terminates, or drops, communication link 120 between MS 102 and BTS 106. Likewise, PSMM's are also used to add BTSs or sectors to the active set of the MS.

Figure 2:
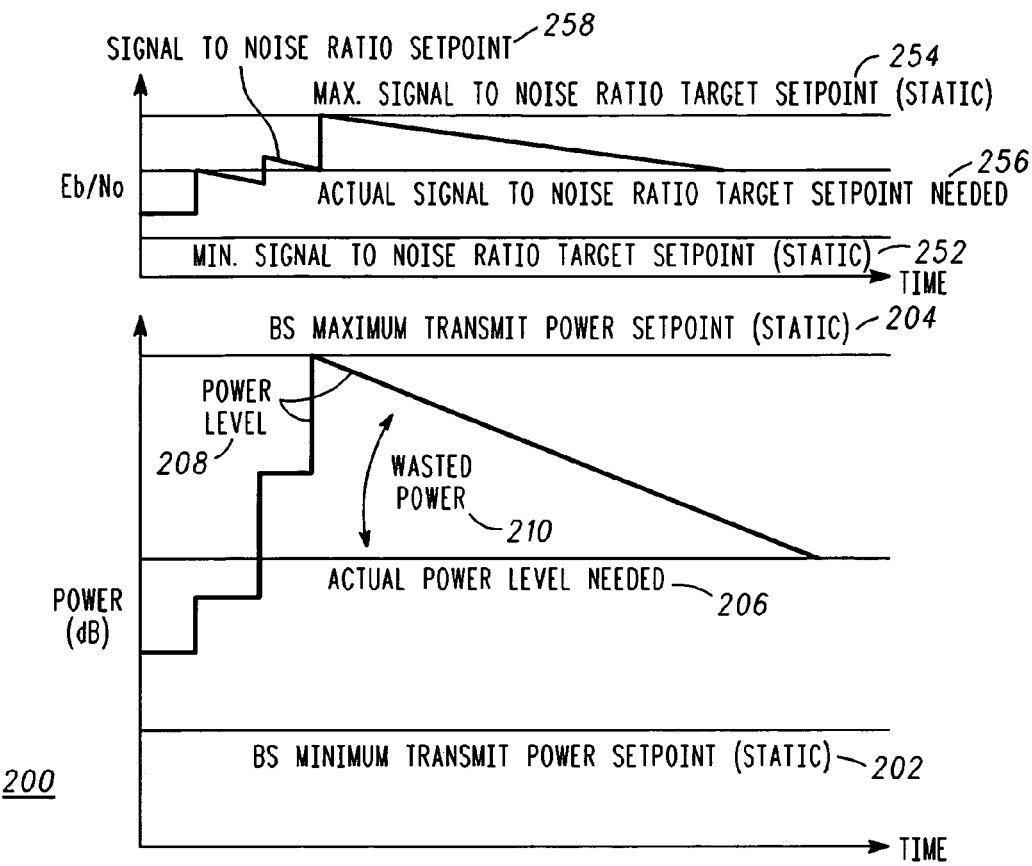
FIG. 2 representatively illustrates the prior art method of fast forward power control in accordance with an exemplary embodiment of the present invention.

FIG. 2 representatively illustrates the prior art method of fast forward power control in accordance with an exemplary embodiment of the present invention. It is the object of forward link power control (FLPC) to assign reasonable power to forward traffic channels, and to minimize the interference with other users in the same cell and with the users in adjacent cells on the condition of ensuring the communication quality. Namely, the forward channel transmitting power should be as low as possible on the condition that minimal required signal-to-noise ratio for demodulation in mobile stations is met. The adjustment of forward power control not only eliminates the "distance" effect and tracks changing link conditions such as fading and shadowing, but also reduces the forward transmitting power to a minimum, depresses the interference with other users and increases the forward link capacity with communication quality ensured.

In IS-95 systems, FLPC tends to make every traffic channel transmit the lowest power under the condition that the desired frame error rate (FER) demanded by a mobile station is obtained. The mobile station continuously measures the FER in forward traffic channels and reports the power measurement report message up to the base station at a certain interval or at the time when the FER reaches a given threshold. Based on the FER report, the base station increases or decreases the transmitting power in the forward traffic channel with appropriate means. Of course, the base station limits the dynamic range of transmitting power in every traffic channel to guarantee the power to be under a maximum for not generating stronger interference and to be above a minimum for ensuring communication quality. In the prior art, the dynamic range limitations are static and fixed.

For RC1, the base station adjusts the transmitting power in forward channel based on the power measurement report message (PMRM) from the mobile station. The threshold report mode is used in IS-95 systems. In essence, based on the power threshold report, the quality of the current frame is determined indirectly, and the increase or decrease of power is decided thereby.

For RC2, besides by using PMRM, the base station adjusts the forward channel transmitting power by the erasure indication bit (EIB) in every reverse traffic frame via the codes received from the mobile station (EIB indicates whether the mobile station has received the last forward traffic data frame correctly). Since the reception of EIB is performed in every frame, it is obvious that the control period for adjustment of forward channel power by EIB is at least 20 ms. It is seen that forward power control in IS-95A systems is a type of slow control mode with the control rate not higher than 50 Hz.

In CDMA2000-1X systems, when a mobile station experiences rapidly changing link conditions, such as Rayleigh fading, the previous slow FLPC is less efficient in tracking and responding to the rapidly changing RF link conditions. Compared to CDMA95A systems, forward power control in CDMA2000-1X systems, on the one hand, is compatible with the forward power control mode of CDMA95A systems for RC1 and RC2, and on the other hand, incorporates fast forward link power control (FFLPC) into forward links for RC3-RC5 configurations. In IMT2000 standard, the fast closed-loop forward link power control mode at the adjustment speed of 800 Hz, 400 Hz and 200 Hz for RC3-RC5 conditions is used.

FFLPC may include an inner loop power control and an outer loop power control. The outer loop power control on the mobile station side and the inner loop power control by both the mobile station and base station may be described as follows. (1) In outer loop power control, the target FER is obtained at a period of 20 ms by estimating and adjusting the setpoint based on the signal-to-noise ratio (Eb/No) of the specified forward link. The adjustment of the setpoint can help the base station to obtain the appropriate power transmitting level in the forward link of inner loop power control. There are three forms of Eb/No setpoint: initial setpoint, maximum setpoint and minimum setpoint, which are sent to the mobile station by the base station in the form of a message. (2) In inner loop power control, the instruction of increasing or decreasing forward power control bit sent to the base station in the reverse link is determined by comparing the estimated Eb/No of the received signal in the forward traffic channel with the current setpoint for the outer power control. The highest adjustment speed of power control instructions can reach 800 Hz at most.

In order to maintain 1% forward link FER, the mobile station adjusts its setpoint up based on FER events 100 times faster than it backs its setpoint down. For 2% forward link FER, the mobile station adjusts its setpoint up based on FER events 50 times faster than it backs its setpoint down. After increasing transmit power in response to a request from the mobile station, the BS slowly decreases transmit power over time as long as no further power increase requests are received from BS. Also, in order to maintain 1% forward link FER, FFLPC requires MS to increase the target Eb/No 100 times faster than it backs down. After increasing target Eb/No in response to an increase in forward link FER, MS slowly decreases target Eb/No over time as long as forward link FER is adequate.

The top graph 250 of FIG. 2 represents the signal-to-noise ratio (Eb/No) vs. time as set by the mobile station 102 within a given maximum and minimum boundary. As shown in FIG. 2, the minimum signal-to-noise ratio target setpoint 252 and maximum signal-to-noise ratio target set point 254 are sent to mobile station 102 by base station 106. As the mobile station 102 experiences forward link FER, the signal-to-noise ratio setpoint 258 is increased, as shown in the substantially vertical increases in signal-to-noise ratio setpoint 258 up to the maximum signal-to-noise ratio target setpoint 254. Over time, as the forward link FER is within acceptable bounds, the signal-to-noise ratio setpoint 258 decreases.

The bottom graph 200 of FIG. 2 represents the transmit power vs. time at the base station as it reacts to requests for more transmit power from the mobile station. As the mobile station 102 experiences reduced signal strength or increased forward link FER, the mobile station increases its signal-to-noise ratio setpoint 258 and correspondingly requests that base station increase transmit power level 208. Base station may increase transmit power level 208 up to a BS maximum transmit power setpoint 204. Over time the transmit power 208 decreases, but will not fall below a BS minimum transmit power setpoint 202. While there may be a delay between the mobile station increasing the signal-to-noise ratio setpoint 258 and the base station actually increasing transmit power level 206, the delay is omitted here for clarity.

In real RF conditions, aspects such as link imbalance and deep fades can cause errors in fast forward power control information received from the mobile station, which can cause the BS to ramp up to excessive transmit power, particularly in soft handoff conditions. This can also cause the mobile station to overshoot its target signal-to-noise ratio setpoint, further exacerbating the problem. Both of these cause the BS to ramp up its transmit power far in excess of what is required. The static setpoints for maximum transmit power from the base station and maximum signal-to-noise ratio setpoint for the mobile station do not compensate for this. This is illustrated by the area under the transmit power level 208 and above the actual power level needed 206, which represents wasted transmit power 210 of the base station. During this time that the BS transmit power level 208 decreases from it's "overshoot" position back down to the actual power level needed 206, the base station is transmitting on the forward link to the mobile station at an unnecessarily high power level. This decreases the forward capacity of the base station and causes severe interference in communications among other users of the system. As a consequence, the increased interference to other users causes the other users to increases their Eb/No target setpoint and request more transmit power from the base station, causing further decreased forward capacity, interference, and so on.

Figure 3:
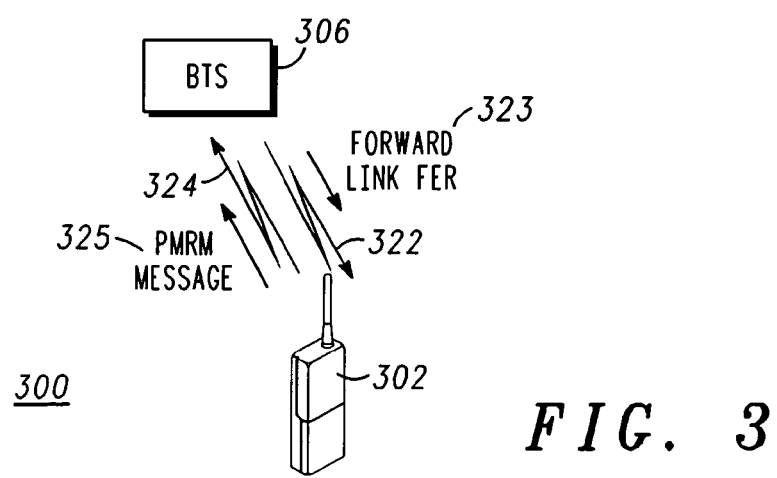
FIG. 3 representatively illustrates a wireless communication system in accordance with an exemplary embodiment of the present invention.

FIG. 3 representatively illustrates a wireless communication system 300 in accordance with an exemplary embodiment of the present invention. The wireless communication system 300 shown in FIG. 3 is a subset of the wireless communication system shown in FIG. 1.

Mobile station 302 is wirelessly coupled to base station 306 via forward link 322 and reverse link 324. In an embodiment of the invention, the actual forward link FER 323 experienced by mobile station may be communicated to base station 306 on reverse link 324. In one embodiment, forward link FER 323 may be communicated to base station 306 using a PMRM message 325. In one embodiment, forward link FER measurement 323 may be communicated to base station 306 periodically, every so many frames. In another embodiment, forward link FER measurement 323 may be communicated to base station 306 only when forward link FER measurement 323 reaches a certain threshold. In yet another embodiment, forward link FER measurement 323 may be communicated to base station 306 when base station 306 requests such a communication.

In addition to the prior art method of calculating the forward link FER and adjusting the target Eb/No setpoint at the MS to be used for the forward link 322, the mobile station 302 communicates the forward link FER measurement 323 directly to the base station. In an embodiment, if the forward link FER measurement 323 is greater than or less than a threshold FER, for example 1%, 2%, and the like, maximum and/or minimum transmit power setpoints for the base station may be adjusted. Determining whether the forward link FER measurement 323 is greater or less than a threshold FER may occur at the mobile station 302 or the base station 306. In another embodiment, if the forward link FER measurement 323 is greater than or less than a threshold FER, for example 1%, 2%, and the like, maximum and/or minimum signal-to-noise ratio set points may be adjusted.

Figure 4:
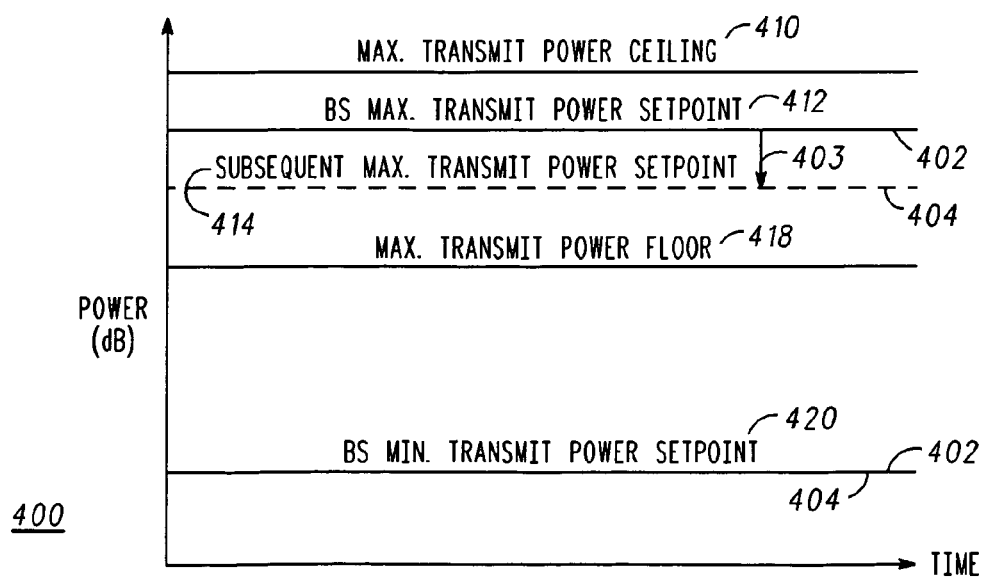
FIG. 4 representatively illustrates a graphical representation of a method of the invention in accordance with an exemplary embodiment of the present invention.

FIG. 4 representatively illustrates a graphical representation 400 of a method of the invention in accordance with an exemplary embodiment of the present invention. The graph depicted in FIG. 4 represents transmit power vs. time at the base station on a forward link to a mobile station. In an embodiment of the invention, base station includes a maximum transmit power floor 418 and a maximum transmit power ceiling 410. In embodiment, the base station maximum transmit power on the forward link for a given mobile station may vary between each of maximum transmit power floor 418 and maximum transmit power ceiling 410.

In an exemplary embodiment, base station has an initial base station transmit power boundary 402, which may include base station minimum transmit power setpoint 420 and base station maximum transmit power setpoint 412. In an embodiment, the transmit power setpoint for a forward link may be vary between the BS minimum transmit power setpoint 420 and the BS maximum transmit power setpoint 412.

In an embodiment, mobile station may send forward link FER measurements to base station via the reverse link. Based on the forward link FER measurement received, the base station may perform a base station transmit power boundary adjustment 403. In an embodiment, the BS transmit power boundary adjustment 403 may include adjusting the initial BS transmit power boundary 402 to a second BS transmit power boundary 404. In this embodiment, BS maximum transmit power setpoint 412 is moved to a subsequent maximum transmit power setpoint 414. In the embodiment shown, BS maximum transmit power setpoint 412 is reduced to subsequent BS maximum transmit power setpoint 414, and may be reduced no lower than a maximum transmit power floor 418. In another embodiment, BS maximum transmit power setpoint 412 may be increased up to maximum transmit power ceiling 410. Subsequent to adjustment, the transmit power setpoint for a forward link may vary between the BS minimum transmit power setpoint 420 and the subsequent BS maximum transmit power setpoint 414. In other words, subsequent to adjustment, transmit power setpoint for a forward link may vary within the second BS transmit power boundary 404.

To illustrate further, mobile station may send forward link FER measurement to base station via reverse link. If the forward link FER measurement is above an FER threshold value, and if BS maximum transmit power setpoint 412 is not at a maximum transmit power ceiling 410, the BS maximum transmit power setpoint 412 is increased. If the forward link FER measurement is below the FER threshold value, and if BS maximum transmit power setpoint 412 is not at a maximum transmit power floor 418, the BS maximum transmit power setpoint 412 is decreased.

Although not shown in FIG. 4, based on the above description, one skilled in the art would understand that an analogous operation may be performed to adjust the BS minimum transmit power setpoint 420 based on the forward link FER measurement. For example, if the forward link FER measurement is above the FER threshold, and if a BS minimum transmit power setpoint 420 is not at a minimum transmit power ceiling, the BS minimum transmit power setpoint 420 is increased. If the forward link FER measurement is below the FER threshold value, and if BS minimum transmit power setpoint 420 is not at a minimum transmit power floor, the BS minimum transmit power setpoint 420 is decreased.

In an embodiment, second BS transmit power boundary 404 may include one or both of subsequent maximum transmit power setpoint 414 and a subsequent minimum transmit power setpoint.

In an embodiment, FER threshold value may be any value selected by one skilled in the art. For example FER threshold value may be selected to maintain a given voice or data quality at the mobile station, and the like. In an embodiment, FER threshold value may vary over time or based on a soft handoff state or call service class. In an embodiment, soft handoff state may include how many base stations that mobile station is wirelessly coupled to, for example, in a handoff situation from one base station to another. In an embodiment, call service class may include the class of subscription of a subscriber such that a certain call quality is maintained or certain services are provided, and the like. In an embodiment, a different FER threshold value may be used for adjusting the BS minimum transmit power setpoint 420 and the BS maximum transmit power setpoint 412.

In an embodiment, the rate of change of the BS transmit power boundary adjustment may be a function of at least one of the soft handoff state of the mobile station or the call service class of a subscriber. For example, if the mobile station is in a soft handoff state with three base stations, the rate of change of the BS transmit power boundary adjustment may be faster than if the mobile station is in a soft handoff state with only two base stations. Also, if the mobile station is not in a soft handoff state, the rate of change of the BS transmit power boundary adjustment may be slower than if the mobile station is in a soft handoff state. In another example, the rate of change of the BS transmit power boundary adjustment may faster for a call service class of a subscriber where a higher call quality is expected or features of the call service class require a higher quality.

In another embodiment, at least one of the maximum transmit power ceiling 410 and the maximum transmit power floor 418 may be a function of at least one of the soft handoff state or the call service class of a subscriber. For example, in a higher-level soft handoff state (three base stations instead of two), the maximum transmit power ceiling 410 and/or the maximum transmit power floor 418 may be lower as well. In an analogous embodiment, a minimum transmit power ceiling and minimum transmit power floor may vary as a function of soft handoff state and/or call service class of a subscriber.

An advantage of allowing the BS transmit power boundary to vary as a function of the measured forward link FER is that the BS transmit power boundary varies based on actual call quality and RF conditions. This optimizes forward link power control setpoints such that the BS transmit power setpoint may vary allowing a reduction in forward link transmit power and an increase in forward link capacity. The optimization may occur because overshooting of the actual required transmit power setpoint is either prevented or limited in deep fade situations or where an error occurs in the power control bit received from the mobile station.

Figure 5:
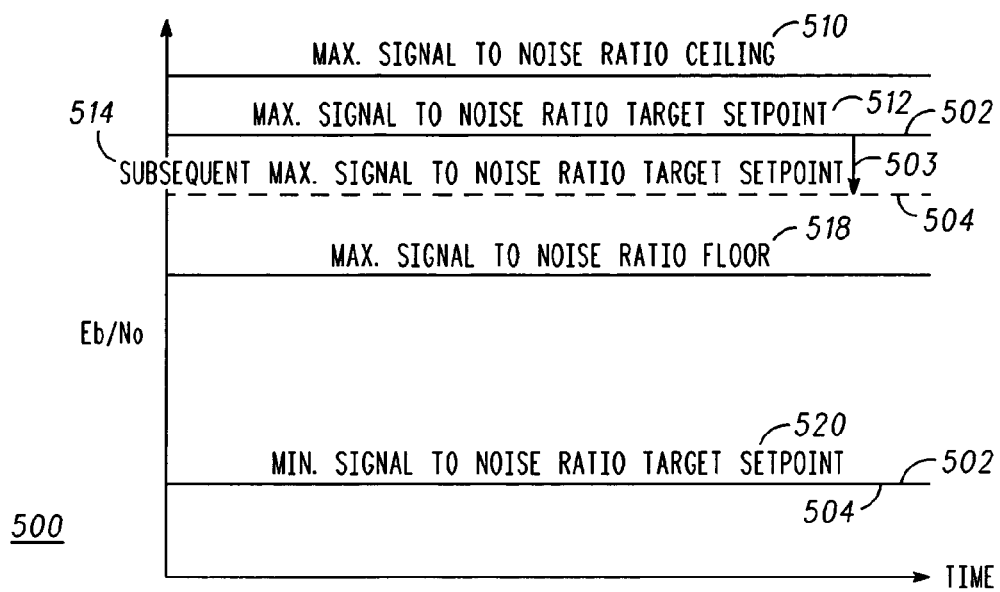
FIG. 5 representatively illustrates a graphical representation of a method of the invention in accordance with another exemplary embodiment of the present invention.

FIG. 5 representatively illustrates a graphical representation 500 of a method of the invention in accordance with another exemplary embodiment of the present invention. The graph depicted in FIG. 5 represents signal-to-noise ratio (Eb/No) vs. time of the forward link at the mobile station. In an embodiment of the invention, mobile station includes a maximum signal-to-noise ratio floor 518 and a maximum signal-to-noise ratio ceiling 510. In an embodiment, the maximum signal-to-noise ratio on the forward link for a given mobile station may vary between each of maximum signal-to-noise ratio floor 518 and maximum signal-to-noise ratio ceiling 510.

In an exemplary embodiment, mobile station has an initial signal-to-noise ratio boundary 502, which may include minimum signal-to-noise ratio target setpoint 520 and maximum signal-to-noise ratio target setpoint 512. In an embodiment, the signal-to-noise ratio target setpoint for a forward link may be vary between the minimum signal-to-noise ratio target setpoint 520 and the maximum signal-to-noise ratio target setpoint 512.

In an embodiment, mobile station may send forward link FER measurement to base station via the reverse link. Based on the forward link FER measurement received, the base station may transmit new signal-to-noise ratio boundaries, or perform a mobile station signal-to-noise ratio boundary adjustment 503. In an embodiment, the MS signal-to-noise ratio boundary adjustment 503 may include adjusting the initial signal-to-noise ratio boundary 502 to a second signal-to-noise ratio boundary 504. In this embodiment, maximum signal-to-noise ratio target setpoint 512 is moved to a subsequent maximum signal-to-noise ratio target setpoint 514. In the embodiment shown, maximum signal-to-noise ratio target setpoint 512 is reduced to subsequent maximum signal-to-noise ratio target setpoint 514, and may be reduced no lower than a maximum signal-to-noise ratio floor 518. In another embodiment, maximum signal-to-noise ratio target setpoint 512 may be increased up to maximum signal-to-noise ratio ceiling 510. Subsequent to adjustment, the signal-to-noise ratio target setpoint for a forward link may be vary between the minimum signal-to-noise ratio target setpoint 520 and the subsequent maximum signal-to-noise ratio target setpoint 514. In other words, subsequent to adjustment, signal-to-noise ratio target setpoint for a forward link may vary within the second signal-to-noise ratio boundary 504.

To illustrate further, mobile station may send forward link FER measurement to base station via reverse link. If the forward link FER measurement is above an FER threshold value, and if maximum signal-to-noise ratio target setpoint 512 is not at a maximum signal-to-noise ratio ceiling 510, the maximum signal-to-noise ratio target setpoint 512 is increased. If the forward link FER measurement is below the FER threshold value, and if maximum signal-to-noise ratio target setpoint 512 is not at a maximum signal-to-noise ratio floor 518, the maximum signal-to-noise ratio target setpoint 512 is decreased.

Although not shown in FIG. 5, based on the above description, one skilled in the art would understand that an analogous operation may be performed to adjust the minimum signal-to-noise ratio target setpoint 520 based on the forward link FER measurement. For example, if the forward link FER measurement is above the FER threshold, and if a minimum signal-to-noise ratio target setpoint 520 is not at a minimum signal-to-noise ratio ceiling, the minimum signal-to-noise ratio target setpoint 520 is increased. If the forward link FER measurement is below the FER threshold value, and if minimum signal-to-noise ratio target setpoint 520 is not at a minimum signal-to-noise ratio floor, the minimum signal-to-noise ratio target setpoint 520 is decreased.

In an embodiment, second signal-to-noise ratio boundary 504 may include one or both of subsequent maximum signal-to-noise ratio target setpoint 514 and a subsequent minimum signal-to-noise ratio target setpoint.

In an embodiment, FER threshold value may be any value selected by one skilled in the art. For example FER threshold value may be selected to maintain a given signal-to-noise ratio at the mobile station, and the like. In an embodiment, FER threshold value may vary over time or based on a soft handoff state or call service class. In an embodiment, a different FER threshold value may be used for adjusting the minimum signal-to-noise ratio target setpoint 520 and the maximum signal-to-noise ratio target setpoint 512.

In an embodiment, the rate of change of the signal-to-noise ratio boundary adjustment may be a function of at least one of the soft handoff state of the mobile station or the call service class of a subscriber. For example, if the mobile station is in a soft handoff state with three base stations, the rate of change of the signal-to-noise ratio boundary adjustment may be faster than if the mobile station is in a soft handoff state with only two base stations. Also, if the mobile station is not in a soft handoff state, the rate of change of the signal-to-noise ratio boundary adjustment may be slower than if the mobile station is in a soft handoff state. In another example, the rate of change of the signal-to-noise ratio boundary adjustment may faster for a call service class of a subscriber where a higher call quality is expected or features of the call service class require a higher quality.

In another embodiment, at least one of the maximum signal-to-noise ratio ceiling 510 and the maximum signal-to-noise ratio floor 518 may be a function of at least one of the soft handoff state or the call service class of a subscriber. For example, in a higher-level soft handoff state (three base stations instead of two), the maximum signal-to-noise ratio ceiling 510 and/or the maximum signal-to-noise ratio floor 518 may be lower (or higher) as well. In an analogous embodiment, a minimum signal-to-noise ratio ceiling and minimum signal-to-noise ratio floor may vary as a function of soft handoff state and/or call service class of a subscriber.

An advantage of allowing the signal-to-noise ratio boundary to vary as a function of forward link FER is that the signal-to-noise ratio boundary varies based on actual call quality and RF conditions. This optimizes forward link power control setpoints such that the signal-to-noise ratio target setpoint may vary allowing a reduction in forward link transmit power requested and an increase in forward link capacity. The optimization may occur because overshooting of the actual required signal-to-noise ratio target setpoint is either prevented or limited in deep fade situations or in some cases undershooting of the required signal-to-noise ratio target setpoint can also be avoided.

Figure 6:
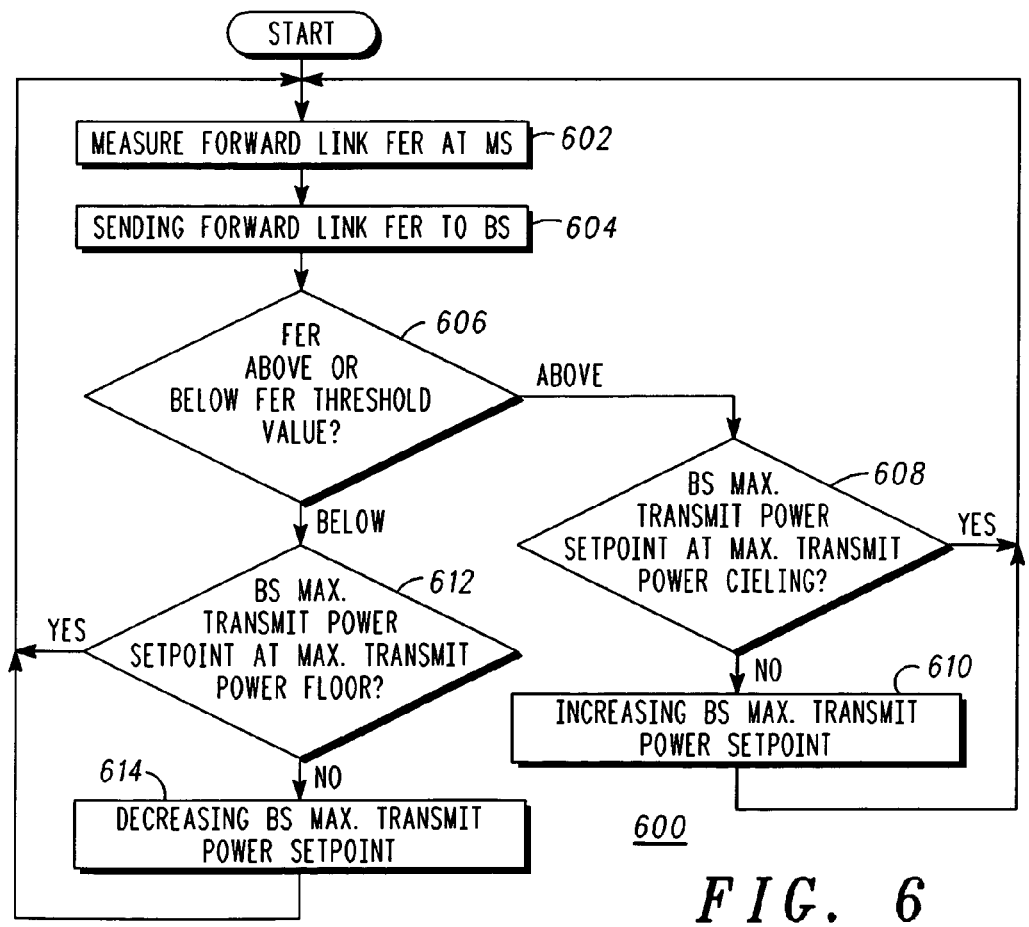
FIG. 6 representatively illustrates a flow diagram in accordance with a method of the invention.

FIG. 6 representatively illustrates a flow diagram 600 in accordance with a method of the invention. Step 602 includes measuring a forward link FER measurement at the mobile station. Step 604 includes sending the forward link FER measurement to the base station. In an embodiment, the forward link FER measurement may be sent periodically or when the forward link meets an FER threshold value.

In step 606, it is determined if forward link FER measurement is above or below a threshold FER. If it is above, in step 608 it is determined if the BS maximum transmit power setpoint is at the maximum transmit power ceiling. If not, the BS maximum transmit power setpoint is increased per step 610. If the BS maximum transmit power setpoint is at the maximum transmit power ceiling in step 608, then the process returns to start.

If the forward link FER measurement is below the FER threshold in step 606, it is determined if the BS maximum transmit power setpoint is at a maximum transmit power floor per step 612. If not, the BS maximum transmit power setpoint is decreased per step 614. If the BS maximum transmit power setpoint is at the maximum transmit power ceiling in step 612, then the process returns to start.

One skilled in the art would understand that an analogous operation may be performed to adjust the BS minimum transmit power setpoint based on the forward link FER measurement in an analogous procedure to that described above.

Figure 7:
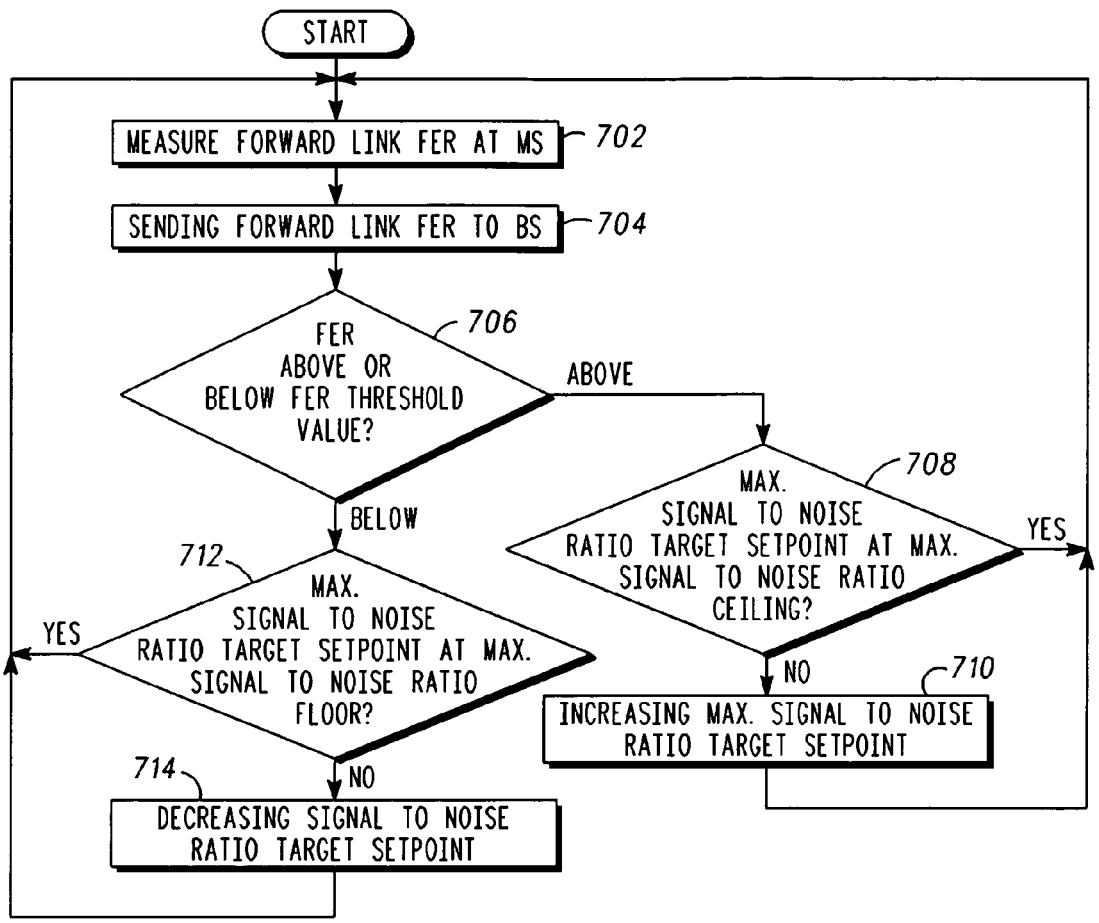
FIG. 7 representatively illustrates a flow diagram in accordance with another method of the invention.

FIG. 7 representatively illustrates a flow diagram in accordance with another method of the invention. Step 702 includes measuring a forward link FER at the mobile station. Step 704 includes sending the forward link FER measurement to the base station. In an embodiment, the forward link FER measurement may be sent periodically or when the forward link meets an FER threshold value.

In step 706, it is determined if forward link FER measurement is above or below a threshold FER. If it is above, in step 708 it is determined if the maximum signal-to-noise ratio target setpoint is at the maximum signal-to-noise ratio ceiling. If not, the maximum signal-to-noise ratio target setpoint is increased per step 710. If the maximum signal-to-noise ratio target setpoint is at the maximum signal-to-noise ratio ceiling in step 708, then the process returns to start.

If the forward link FER measurement is below the FER threshold in step 706, it is determined if the maximum signal-to-noise ratio target setpoint is at a maximum signal-to-noise ratio floor per step 712. If not, the maximum signal-to-noise ratio target setpoint is decreased per step 714. If the maximum signal-to-noise ratio target setpoint is at the maximum signal-to-noise ratio ceiling in step 712, then the process returns to start.

One skilled in the art would understand that an analogous operation may be performed to adjust the minimum signal-to-noise ratio target setpoint based on the forward link FER measurement in an analogous procedure to that described above.

It is clear from the foregoing that fast forward power control is still allowed to fully vary and rapidly adjust to link conditions in the implementation of this invention. Only the limits within which both fast forward power control, as well as outer loop power control, are constrained to operate within may be adjusted. The adjustment to these minimum and maximum constraints may be based on feedback from the mobile station consisting of its measured forward link FER. The mobile station's minimum and maximum outerloop setpoint constraints may be adjusted in order to prevent overshoot in the mobile station's outer loop power control behavior, wasting transmit power and system capacity. The minimum and maximum transmit power constraints at the base stations may be adjusted in order to prevent the base station from transmitting at excessive power levels, wasting system capacity, due to conditions such as errors in the power control bits being received back from the mobile as part of the fast forward power control operation.

In the foregoing specification, the invention has been described with reference to specific exemplary embodiments; however, it will be appreciated that various modifications and changes may be made without departing from the scope of the present invention as set forth in the claims below. The specification and figures are to be regarded in an illustrative manner, rather than a restrictive one and all such modifications are intended to be included within the scope of the present invention. Accordingly, the scope of the invention should be determined by the claims appended hereto and their legal equivalents rather than by merely the examples described above.

For example, the steps recited in any method or process claims may be executed in any order and are not limited to the specific order presented in the claims. Additionally, the components and/or elements recited in any apparatus claims may be assembled or otherwise operationally configured in a variety of permutations to produce substantially the same result as the present invention and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

As used herein, the terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

We claim:

1. A method of power control in a 3G wireless communication system, comprising:
   a mobile station communicating a forward link Frame Error Rate (FER) measurement to a base station on a reverse link;
   the base station performing at least one of a base station transmit power boundary adjustment and a mobile station signal-to-noise ratio boundary adjustment based on the forward link FER measurement received from the mobile station, wherein the base station transmit power boundary adjustment comprises:
   if the forward link FER measurement is above an FER threshold value, and if a base station maximum transmit power setpoint is not at a maximum transmit power ceiling, increasing the base station maximum transmit power setpoint;
   if the forward link FER measurement is below the FER threshold value and if the base station maximum transmit power setpoint is not at a maximum transmit power floor, decreasing the base station maximum transmit power setpoint;
   and wherein the mobile station signal-to-noise ratio boundary adjustment comprises:
   if the forward link FER measurement is above the FER threshold value, and if a maximum signal-to-noise ratio target setpoint is not at a maximum signal-to-noise ratio ceiling, increasing the maximum signal-to-noise ratio target setpoint; and
   if the forward link FER measurement is below the FER threshold value, and if the maximum signal-to-noise ratio target setpoint is not at a maximum signal-to-noise ratio floor, decreasing the maximum signal-to-noise ratio target setpoint.

2. The method of claim 1, wherein the base station transmit power boundary adjustment comprises:
   if the forward link FER measurement is above a FER threshold value, and if a base station minimum transmit power setpoint is not at a minimum transmit power ceiling, increasing the base station minimum transmit power setpoint; and
   if the forward link FER measurement is below the FER threshold value and if the base station minimum transmit power setpoint is not at a minimum transmit power floor, decreasing the base station minimum transmit power setpoint.

3. The method of claim 1, wherein the mobile station signal-to-noise ratio boundary adjustment comprises:
   if the forward link FER measurement is above the FER threshold value, and if a minimum signal-to-noise ratio target setpoint is not at a minimum signal-to-noise ratio ceiling, increasing the minimum signal-to-noise ratio target setpoint; and
   if the forward link FER measurement is below the FER threshold value, and if the minimum signal-to-noise ratio target setpoint is not at a minimum signal-to-noise ratio floor, decreasing the minimum signal-to-noise ratio target setpoint.

4. The method of claim 1, wherein the mobile station communicating the forward link FER measurement to the base station on the reverse link comprises the mobile station communicating the forward link FER measurement to the base station on the reverse link using a PMRM message.

5. The method of claim 1, wherein a rate of change of the base station transmit power boundary adjustment is a function of at least one of a soft handoff state and a call service class.

6. The method of claim 1, wherein a rate of change of the mobile station signal-to-noise ratio boundary adjustment is a function of at least one of a soft handoff state and a call service class.

7. The method of claim 1, wherein at least one of the maximum transmit power ceiling and the maximum transmit power floor is a function of at least one of a soft handoff state and a call service class.

8. The method of claim 1, wherein at least one of the maximum signal-to-noise ratio ceiling and the maximum signal-to-noise ratio floor is a function of at least one of a soft handoff state and a call service class.

9. A method of power control in a 3G wireless communication system, comprising:
   setting an initial base station transmit power boundary and an initial signal-to-noise ratio boundary;
   a mobile station communicating a forward link Frame Error Rate(FER) measurement to a base station on a reverse link;
   the base station performing at least one of a base station transmit power boundary adjustment and a mobile station signal-to-noise ratio boundary adjustment based on the forward link FER measurement received from the mobile station, wherein the base station transmit power boundary adjustment comprises:
   adjusting the initial base station transmit power boundary to a second base station transmit power boundary; and
   wherein the mobile station signal-to-noise ratio boundary adjustment comprises:
   adjusting the initial signal-to-noise ratio boundary to a second signal-to-noise ratio boundary, and
   wherein the step of adjusting the initial base station transmit power boundary comprises:
   if the forward link FER measurement is above an FER threshold value, and if a base station maximum transmit power setpoint is not at a maximum transmit power ceiling, increasing the base station maximum transmit power setpoint; and
   if the forward link FER measurement is below the FER threshold value and if the base station maximum transmit power setpoint is not at a maximum transmit power floor, decreasing the base station maximum transmit power setpoint.

10. The method of claim 9, wherein the mobile station communicating the forward link FER measurement to the base station on the reverse link comprises the mobile station communicating the forward link FER measurement to the base station on the reverse link using a PMRM message.

11. The method of claim 9, further comprising performing a fast forward link power control procedure within at least one of the second base station transmit power boundary and the second signal-to-noise ratio boundary.

12. The method of claim 9, wherein a rate of change from the initial base station transmit power boundary to the second base station transmit power boundary is a function of at least one of a soft handoff state and a call service class.

13. The method of claim 9, wherein a rate of change from the initial signal-to-noise ratio boundary to the second signal-to-noise ratio boundary is a function of at least one of a soft handoff state and a call service class.

14. A method of power control in a 3G wireless communication system, comprising:
   setting an initial base station transmit power boundary and an initial signal-to-noise ratio boundary;

a mobile station communicating a forward link Frame Error Rate (FER) measurement to a base station on a reverse link;

the base station performing at least one of a base station transmit power boundary adjustment and a mobile station signal-to-noise ratio boundary adjustment based on the forward link FER measurement received from the mobile station, wherein the base station transmit power boundary adjustment comprises:

adjusting the initial base station transmit power boundary to a second base station transmit power boundary; and wherein the mobile station signal-to-noise ratio boundary adjustment comprises:

adjusting the initial signal-to-noise ratio boundary to a second signal-to-noise ratio boundary wherein the step of adjusting the initial signal-to-noise ratio boundary comprises:

if the forward link FER measurement is above an FER threshold value, and if a maximum signal-to-noise ratio target setpoint is not at a maximum signal-to-noise ratio ceiling, increasing the maximum signal-to-noise ratio target setpoint; and if the forward link FER measurement is below the FER threshold value, and if the maximum signal-to-noise ratio target setpoint is not at a maximum signal-to-noise ratio floor, decreasing the maximum signal-to-noise ratio target setpoint.

15. A computer-readable medium containing computer instructions for instructing a processor to perform a method of power control in a 3G wireless communication system, comprising:

setting an initial base station transmit power boundary and an initial signal-to-noise ratio boundary;

a mobile station communicating a forward link Frame Error Rate (FER) measurement to a base station on a reverse link;

the base station performing at least one of a base station transmit power boundary adjustment and a mobile station signal-to-noise ratio boundary adjustment based on the forward link FER measurement received from the mobile station, wherein the base station transmit power boundary adjustment comprises:

adjusting the initial base station transmit power boundary to a second base station transmit power boundary; and wherein the mobile station signal-to-noise ratio boundary adjustment comprises:

adjusting the initial signal-to-noise ratio boundary to a second signal-to-noise ratio boundary wherein adjusting the initial signal-to-noise ratio boundary comprises:

if the forward link FER measurement is above an FER threshold value, and if a maximum signal-to-noise ratio target setpoint is not at a maximum signal-to-noise ratio ceiling, increasing the maximum signal-to-noise ratio target setpoint; and if the forward link FER measurement is below the FER threshold value, and if the maximum signal-to-noise ratio target setpoint is not at a maximum signal-to-noise ratio floor, decreasing the maximum signal-to-noise ratio target setpoint.

16. The computer-readable medium of claim 15, wherein a rate of change from the initial base station transmit power boundary to the second base station transmit power boundary is a function of at least one of a soft handoff state and a call service class.

17. The computer-readable medium of claim 15, wherein a rate of change from the initial signal-to-noise ratio boundary to the second signal-to-noise ratio boundary is a function of at least one of a soft handoff state and a call service class.

18. A computer-readable medium containing computer instructions for instructing a processor to perform a method of power control in a 3G wireless communication system, comprising:

setting an initial base station transmit power boundary and an initial signal-to-noise ratio boundary;

a mobile station communicating a forward link Frame Error Rate (FER) measurement to a base station on a reverse link;

the base station performing at least one of a base station transmit power boundary adjustment and a mobile station signal-to-noise ratio boundary adjustment based on the forward link FER measurement received from the mobile station, wherein the base station transmit power boundary adjustment comprises:

adjusting the initial base station transmit power boundary to a second base station transmit power boundary wherein adjusting the initial base station transmit power boundary comprises:

if the forward link FER measurement is above an FER threshold value, and if a base station maximum transmit power setpoint is not at a maximum transmit power ceiling, increasing the base station maximum transmit power setpoint; and if the forward link FER measurement is below the FER threshold value and if the base station maximum transmit power setpoint is not at a maximum transmit power floor, decreasing the base station maximum transmit power setpoint, and wherein the mobile station signal-to-noise ratio boundary adjustment comprises:

adjusting the initial signal-to-noise ratio boundary to a second signal-to-noise ratio boundary.

* * * * *